United States Patent
Chapman, Jr.

(10) Patent No.: US 10,354,266 B2
(45) Date of Patent: Jul. 16, 2019

(54) SYSTEMS AND METHODS FOR PROVIDING LOCATION-BASED GAMING REWARDS

(71) Applicant: MasterCard International Incorporated, Purchase, NY (US)

(72) Inventor: Robert Chapman, Jr., Weldon Spring, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 700 days.

(21) Appl. No.: 14/103,664

(22) Filed: Dec. 11, 2013

(65) Prior Publication Data

US 2015/0161638 A1 Jun. 11, 2015

(51) Int. Cl.
*G06Q 30/00* (2012.01)
*G06Q 30/02* (2012.01)
(Continued)

(52) U.S. Cl.
CPC ....... *G06Q 30/0209* (2013.01); *G06Q 20/204* (2013.01); *G06Q 20/409* (2013.01);
(Continued)

(58) Field of Classification Search
CPC .. G06Q 20/387; G06Q 30/02; G06Q 30/2012; G06Q 30/0226; G06Q 30/0209; G06Q 30/0261; G06Q 30/0611; G06Q 20/204; G06Q 20/409; G07F 17/3227; G07F 17/3239; G07F 17/3237; G07F 17/3244
(Continued)

(56) References Cited

U.S. PATENT DOCUMENTS 7,753,772 B1 7/2010 Walker et al.
7,780,522 B2 8/2010 Lutnick et al.
(Continued)

FOREIGN PATENT DOCUMENTS

KR 10-2002-0087040 A 11/2002
KR 10-2003-0069152 A 8/2003

OTHER PUBLICATIONS

PCT International Search Report for related application PCT/US2014/068901 dated Mar. 24, 2015; 19 pp.

*Primary Examiner* — Raquel Alvarez
(74) *Attorney, Agent, or Firm* — Armstrong Teasdale LLP

(57) ABSTRACT

A computer-implemented method for providing an offer associated with a merchant to a cardholder engaging in a game is implemented by a gaming rewards computer system in communication with a memory. The method includes storing merchant game data for the merchant within the memory wherein the merchant game data includes data associated with a merchant game a merchant offer and a location of the merchant, receiving a game request message from a cardholder computing device associated with the cardholder wherein the game request message includes a cardholder locator identifying a location of the cardholder, providing the merchant game to the cardholder computing device when the cardholder location is within a pre-defined distance of the merchant location, receiving a game result message for the merchant game, and providing the merchant offer to the cardholder computing device based, at least in part, on the game result message.

18 Claims, 8 Drawing Sheets

(51) Int. Cl.
  *G06Q 30/06* (2012.01)
  *G06Q 20/20* (2012.01)
  *G06Q 20/40* (2012.01)
  *G07F 17/32* (2006.01)

(52) U.S. Cl.
  CPC ..... *G06Q 30/0261* (2013.01); *G06Q 30/0611* (2013.01); *G07F 17/3227* (2013.01); *G07F 17/3237* (2013.01); *G07F 17/3239* (2013.01); *G07F 17/3244* (2013.01)

(58) Field of Classification Search
  USPC ........................................................ 705/14.1
  See application file for complete search history.

(56) References Cited

U.S. PATENT DOCUMENTS

| | | | |
|---|---|---|---|
| 8,062,116 B2 | 11/2011 | Lutnick et al. | |
| 8,366,544 B2 | 2/2013 | Walker et al. | |
| 8,544,725 B1 | 10/2013 | Calman | |
| 8,583,549 B1* | 11/2013 | Mohsenzadeh | G06Q 20/227 705/38 |
| 2003/0103644 A1 | 6/2003 | Klayh | |
| 2006/0224456 A1 | 10/2006 | Walker et al. | |
| 2006/0229944 A1 | 10/2006 | Walker et al. | |
| 2006/0229945 A1 | 10/2006 | Walker et al. | |
| 2006/0271431 A1* | 11/2006 | Wehr | G06Q 20/20 705/14.27 |
| 2007/0026916 A1 | 2/2007 | Juds et al. | |
| 2007/0036348 A1 | 2/2007 | Orr | |
| 2007/0198354 A1 | 8/2007 | Senghore et al. | |
| 2008/0153567 A1 | 6/2008 | Juds et al. | |
| 2010/0262537 A1* | 10/2010 | Park | G06Q 20/10 705/39 |
| 2011/0010238 A1* | 1/2011 | Postrel | G06Q 30/02 705/14.38 |
| 2011/0307279 A1 | 12/2011 | Pappas et al. | |
| 2012/0010937 A1* | 1/2012 | Hanson | G06Q 30/02 705/14.27 |
| 2012/0047007 A1 | 2/2012 | Halsey et al. | |
| 2012/0129586 A1 | 5/2012 | Lutnick et al. | |
| 2013/0041725 A1* | 2/2013 | Moore | G06Q 30/0207 705/14.1 |
| 2013/0054353 A1 | 2/2013 | Tabor et al. | |
| 2013/0096996 A1 | 4/2013 | Tabor et al. | |
| 2013/0124330 A1* | 5/2013 | Doughty | G06Q 30/0269 705/14.66 |
| 2013/0130781 A1 | 5/2013 | Anderson et al. | |
| 2013/0130787 A1 | 5/2013 | Walker et al. | |
| 2013/0191213 A1* | 7/2013 | Beck | G06Q 30/0267 705/14.53 |
| 2013/0262203 A1 | 10/2013 | Frederick et al. | |
| 2013/0268431 A1* | 10/2013 | Mohsenzadeh | G06Q 20/34 705/39 |
| 2013/0346170 A1* | 12/2013 | Epstein | G06Q 30/02 705/14.14 |
| 2014/0279178 A1* | 9/2014 | Harman | G06Q 30/0611 705/26.4 |
| 2016/0342990 A1* | 11/2016 | Todasco | G06Q 20/405 |

* cited by examiner

ND METHODS FOR PROVIDING
SYSTEMS AND METHODS FOR PROVIDING LOCATION-BASED GAMING REWARDS

BACKGROUND OF THE DISCLOSURE

The field of the disclosure relates generally to computer-related games and offers provided by a merchant to a cardholder, and more particularly, to systems and methods for providing an offer associated with a merchant to a cardholder that has engaged in a game.

In at least some cardholder-initiated financial transactions, the cardholder (e.g., an entity using a payment card such as a credit card, a debit card, or a prepaid card) may be incentivized to purchase goods or services (collectively referred to herein as "products") based upon a merchant offer. The merchant offer may include, for example, a percentage reduction or nominal reduction in the cost of such products. Alternately, the merchant offer may include receiving an additional product with the purchase of a particular product.

At least some merchants sell products in physical locations such as stores. Customers such as cardholders may develop a stronger affinity to a merchant and a greater propensity to purchase products from the merchant if customers spend more time at the physical location of a merchant. Accordingly, merchants may seek to increase the time that customers spend at their physical locations. At least some merchants may additionally make games available to facilitate affinity relationships between a cardholder and the merchant.

BRIEF DESCRIPTION OF THE DISCLOSURE

In one aspect, a computer-implemented method for providing an offer associated with a merchant to a cardholder engaging in a game is provided. The method is implemented by a gaming rewards computer system in communication with a memory. The method includes storing merchant game data for the merchant within the memory wherein the merchant game data includes data associated with a merchant game a merchant offer and a location of the merchant, receiving a game request message from a cardholder computing device associated with the cardholder wherein the game request message includes a cardholder locator identifying a location of the cardholder, providing the merchant game to the cardholder computing device when the cardholder location is within a pre-defined distance of the merchant location, receiving a game result message for the merchant game, and providing the merchant offer to the cardholder computing device based, at least in part, on the game result message.

In another aspect, a gaming rewards computer system for providing an offer associated with a merchant to a cardholder engaging in a game is provided. The gaming rewards computer system includes a processor and a memory coupled to the processor. The gaming rewards computer system is configured to store merchant game data for the merchant within the memory wherein the merchant game data includes data associated with a merchant game a merchant offer and a location of the merchant, receive a game request message from a cardholder computing device associated with the cardholder, wherein the game request message includes a cardholder locator identifying a location of the cardholder, provide the merchant game to the cardholder computing device when the cardholder location is within a pre-defined distance of the merchant location, receive a game result message for the merchant game, and provide the merchant offer to the cardholder computing device based at least in part on the game result message.

In a further aspect, computer-readable storage media for providing an offer associated with a merchant to a cardholder engaging in a game is provided. The computer-readable storage media has computer-executable instructions embodied thereon. When executed by at least one processor, the computer-executable instructions cause the processor to store merchant game data for the merchant within the memory wherein the merchant game data includes data associated with a merchant game a merchant offer and a location of the merchant, receive a game request message from a cardholder computing device associated with the cardholder, wherein the game request message includes a cardholder locator identifying a location of the cardholder, provide the merchant game to the cardholder computing device when the cardholder location is within a pre-defined distance of the merchant location, receive a game result message for the merchant game, and provide the merchant offer to the cardholder computing device based at least in part on the game result message.

BRIEF DESCRIPTION OF THE DRAWINGS

The figures listed below show example embodiments of the methods and systems described herein.

FIG. 1 is a schematic diagram illustrating an example multi-party payment card industry system for enabling ordinary payment-by-card transactions, including transactions using merchant offers, in which merchants and card issuers do not necessarily have a one-to-one relationship.

FIG. 2 is a simplified block diagram of an example system used to provide an offer associated with a merchant from a gaming rewards computer system to a cardholder engaging in a game using a mobile computing device in accordance with one example embodiment of the present disclosure.

FIG. 3 illustrates an example configuration of a mobile computing device shown in FIG. 2.

FIG. 4 illustrates an example gaming rewards computer system shown in FIG. 2.

FIG. 5 is a data flow diagram of the gaming rewards computer system shown in FIG. 2.

FIG. 6 is a data flow diagram of the gaming rewards computer system shown in FIG. 2 illustrating a cardholder receiving a merchant game based upon proximity to a merchant.

FIG. 7 is a simplified diagram of an example method of providing an offer associated with a merchant from a gaming rewards computer system to a cardholder engaging in a game using the gaming rewards computer system of FIG. 2.

FIG. 8 is a diagram of components of one or more example computing devices that may be used in the environment shown in FIGS. 5 and 6.

Figure 1:
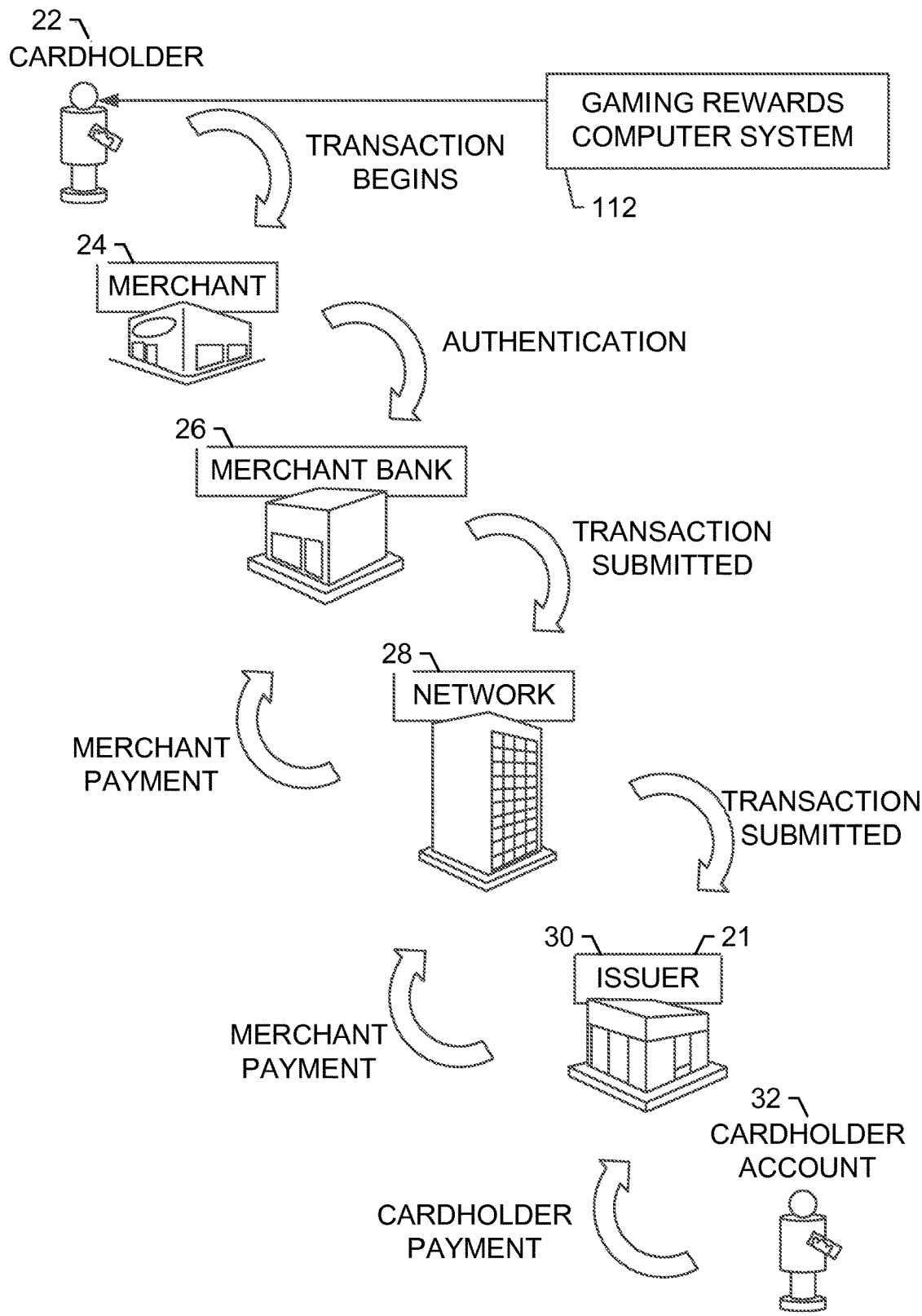
FIGS. 1-8 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of the embodiments of the disclosure refers to the accompanying drawings. The same reference numbers in different drawings may identify the same or similar elements. Also, the following detailed description does not limit the claims.

This subject matter described herein relates generally to location-based merchant games associated with merchant offers or merchant rewards. Specifically, the methods and systems described herein include a gaming rewards computer system in communication with a memory. The gaming rewards computer system is configured to store merchant game data for the merchant within the memory wherein the merchant game data includes data associated with a merchant game a merchant offer and a location of the merchant, receive a game request message from a cardholder computing device associated with the cardholder wherein the game request message includes a cardholder locator identifying a location of the cardholder, provide the merchant game to the cardholder computing device when the cardholder location is within a pre-defined distance of the merchant location, receive a game result message for the merchant game, and provide the merchant offer to the cardholder computing device based, at least in part, on the game result message.

In at least some cardholder-initiated financial transactions, the cardholder (e.g., an entity using a payment card such as a credit card, a debit card, or a prepaid card) may receive merchant rewards or merchant offers (hereinafter referred to as "offers") to incentivize the purchasing of goods or services (collectively referred to herein as "products"). Offers may include, for example and without limitation, reductions in the price of products, rebates or bonuses associated with the purchase of products, additional products received with a purchase of products, and enhanced services associated with the purchase of products.

In at least some examples, the cardholder may additionally purchase products at a physical location associated with a merchant, such as a store. For a variety of reasons, merchants may find it valuable to create extended interactions with customers at the physical location of the merchant. For example, a customer who spends a significant amount of time at a store may become familiar with more merchant products and develop a stronger affinity for the merchant and the merchant products. Such extended interactions may be facilitated, as described herein, by location-based games which are served to customers who are physically present at the physical location of the merchant. Further, when such location-based games are successfully completed, as described herein, they may allow a customer to obtain an offer. Accordingly, location-based games may be used to extend the interaction of customers with the physical location of a merchant and to further incentivize the customers to purchase products from the merchant.

The systems and methods described herein are configured to provide an offer associated with a merchant to a cardholder engaging in a game. The method is implemented using a gaming rewards computer system. The gaming rewards computer system includes a processor coupled to a memory. The gaming rewards computer system stores merchant game data for the merchant within the memory. The merchant game data includes data associated with a merchant game, a merchant offer, and a location of the merchant. In other words, the gaming rewards computer system stores a particular merchant game associated with a merchant offer and a physical location of the merchant. The merchant game data may additionally include additional data including, for example and without limitation, a merchant identifiers, a merchant category, and a merchant offer category. The gaming rewards computer system additionally stores game configuration data. Game configuration data includes, for example and without limitation, a game type of the merchant game, a reward type of the merchant game, a game occurrence rate of the merchant game, and a reward redemption type of the merchant game. The game type may specify the genre of the game. Game types may include, for example and without limitation, adventure games, strategy games, knowledge games, trivia games, price guessing games, competitive games, and sports games. The reward type of the merchant game specifies the type of reward or offer associated with the merchant game. The reward type may include, for example and without limitation, a discount, a rebate, a promotional product available with purchase, and rewards points for use in a rewards program. The reward redemption type may specify the terms and conditions of the redemption of the offer. For example, the reward redemption type may specify that the reward or offer may be redeemed on purchase, without purchase, or on a particular date.

The gaming rewards computer system receives a game request message from a cardholder computing device such as a mobile computing device. The game request represents a request from the cardholder computing device for a merchant game to be retrieved from merchant game data. As described herein, merchant games are location-based. Accordingly, the game request includes a cardholder locator identifying the location of the cardholder. In other words, when the cardholder is proximate to a merchant, the cardholder includes a cardholder locator in the game request indicating that the cardholder is proximate to the merchant. The cardholder computing device may determine the cardholder locator by identifying the cardholder location. In one example, the cardholder location may be identified by using geo-location features of the cardholder computing device. For example, cardholder computing devices may include global positioning system ("GPS") functions. Alternately, cardholder computing devices may use WiFi positioning, radio frequency location, proximity sensing methods using communication protocols such as Bluetooth™, and any other method of geo-location available to the cardholder computing device. In some examples, communications beacons associated with the merchant may be used to determine the location of the cardholder computing device. Alternately, the cardholder computing device may identify the cardholder location by scanning a merchant identifier at the merchant location. The merchant identifier may be any merchant identifier including, for example and without limitation, a barcode, an RFID tag, a quick response code ("QR Code"), a universal resource locator ("URL"), or any other location identifier that may be scanned by the cardholder computing device.

The gaming rewards computer system processes the game request message and determines at least one merchant game and merchant offer associated with the cardholder locator. The gaming rewards computer system determines the merchant game and merchant offer by identifying merchant game data wherein the location of the merchant most closely corresponds to the cardholder locator. In some examples, the gaming rewards computer system may determine that the location of the merchant includes a region encompassing several distinct physical locations. Accordingly, if the cardholder locator is any of the distinct physical locations, the gaming rewards computer system determines that the cardholder is in a location of the merchant. In other examples, the gaming rewards computer system may determine whether the cardholder locator indicates that the cardholder and cardholder computing device is within a minimum, pre-defined distance of the merchant location. The minimum pre-defined distance may be specified in the merchant game data.

Upon determining the merchant game and merchant offer, the gaming rewards computer system provides the merchant game to the cardholder computing device. In some examples, providing the merchant game to the cardholder computing device represents uploading files, binaries, or other data associated with the merchant game to the cardholder computing device. In other examples, providing the merchant game to the cardholder computing device represents sending a signal identifying an appropriate merchant game to the cardholder computing device. In such examples, the cardholder computing device may have already downloaded the files, binaries, or other data associated with the merchant game. Alternately, the cardholder computing device may download such files, binaries, or other data from a secondary gaming server associated with the gaming rewards computer system. In all examples, providing the merchant game to the cardholder computing device further represents generally making the merchant game available to the cardholder computing device. In at least some examples, the cardholder locator may indicate that the cardholder and the cardholder computing device are proximate to a plurality of merchants. In such examples, merchant games for each proximate merchant may be provided.

Using the cardholder computing device, the cardholder participates or plays with the merchant game. As described below, the merchant game may be associated with any of a variety of game types, styles, and formats. In at least some examples, the content of the merchant game is associated with characteristics of the merchant. For example, at least some merchant games may include game elements referring to products sold by the merchant and the prices associated with the products. In a first example, the merchant game may be a price guessing game where the cardholder guesses the price of products sold by the merchant. The goal in this merchant game is for the cardholder to guess the price as accurately as possible without exceeding the price of the product. The cardholder may play this game for a plurality of products to become increasingly familiar with products sold by the merchant and their associated prices.

The merchant game may be played by the user to a game result. The game result may include, for example and without limitation, a total amount of points scored in the merchant game, a level achieved in the merchant game, an indication of whether the merchant game was won or lost, and any other result that may be associated with the playing of the merchant game. In the example of the price guessing game, the cardholder may complete a game result when the cardholder has guessed prices for a predetermined amount of products. Accordingly, the game result may be the aggregate accuracy of the guesses of the products, the accuracy for each guess of the price of the products, or any score or determination based upon the guesses.

The gaming rewards computer system receives a game result message for the merchant game from the cardholder computing device. The game result message includes an indication of the game result, as described above. For example, the game result message may include, for example and without limitation, a total amount of points scored in the merchant game, a level achieved in the merchant game, an indication of whether the merchant game was won or lost, and any other result that may be associated with the playing of the merchant game. Further, the game result message may indicate whether the cardholder has achieved a positive result for the merchant game. The positive result is achieved by satisfying a pre-determined threshold associated with the merchant game. For example, the pre-determined threshold may be a minimum amount of points required to be scored to obtain the positive result. The pre-determined threshold may be specific to each merchant game. For example, for a variety of merchant games, different minimum amounts of points may be required to achieve a positive result.

Based at least in part on the game result message, the gaming rewards computer system determines a merchant offer to provide to the cardholder computing device and provides the merchant offer to the cardholder computing device. In at least one example, the merchant offer is provided when the cardholder achieves the pre-determined threshold on a merchant game and accordingly achieves a positive result. In alternate examples, the merchant offer may vary depending upon the game result message. For example, as a cardholder achieves increasing point scores in the merchant game, the gaming rewards computer system may provide increasing levels of merchant offers. In the example of the price guessing game, a first guess that is 10% from the correct guess may be associated with a merchant offer of a 1% reduction in the price of products while a second guess that is 5% from the correct guess may be associated with a merchant offer of a 3% reduction in the price of products. Accordingly, more accurate guesses (corresponding to better game results) allow the cardholder to receive better merchant offers.

The merchant offer may be determined and provided by the gaming rewards computer system based upon the game type of the merchant game as indicated in the game configuration data stored at the memory of the gaming rewards computer system. In another example, the merchant offer may be determined and provided by the gaming rewards computer system based upon the rewards type of the merchant game as indicated in the game configuration data stored at the memory of the gaming rewards computer system. The merchant offer may also be determined and provided by the gaming rewards computer system based upon a card type associated with the payment card of the cardholder. For example, for the same game result message, a cardholder may receive different merchant offers depending on whether the cardholder uses a debit card or a credit card.

Depending upon the reward redemption type of the merchant game, as indicated in the game configuration data, the cardholder may redeem the merchant offer. For example, if the reward redemption type requires that the merchant offer may be redeemed in combination with a purchase, the cardholder can only redeem the merchant offer with the purchase of a product. Alternately, the reward redemption type may specify that the merchant offer may only be redeemed within a specific time period. In other examples, the reward redemption type may require that the merchant offer only be redeemed during the cardholder's present visit to the merchant. In these examples, the cardholder may be incentivized to make a purchase of products or lose the benefit accrued during the play of the merchant game. The merchant offer may be received in a variety of formats including, for example and without limitation, a bar code that may be scanned at the point-of-sale before purchase, an officer code that may be provided at the point-of-sale before purchase, and a code that may be associated with the card of the cardholder wherein the code may automatically be used in a transaction with the merchant associated with the merchant offer.

Described in detail herein are example embodiments of systems and methods for providing an offer associated with a merchant to a cardholder engaging in a game. The systems and methods facilitate, for example, storing merchant game data for the merchant, receiving a game request message from a cardholder computing device associated with the cardholder, providing the merchant game to the cardholder computing device when the cardholder location is within a pre-defined distance of the merchant location, receiving a game result message for the merchant game, and providing the merchant offer to the cardholder computing device based at least in part on the game result message.

A technical effect of the systems and methods described herein include at least one of (a) facilitating increased interaction between cardholders and merchants; (b) facilitating increased transactions between cardholders and merchants by providing merchant offers to cardholders while cardholders are present at the merchant; (c) bringing cardholders to merchants through the availability of merchant games when the cardholder is proximate to the merchant; and (d) increasing affinity of cardholders to merchants through enhanced engagement using merchant games.

More specifically, the technical effects can be achieved by performing at least one of the following steps: (a) storing merchant game data for the merchant within the memory, wherein the merchant game data includes data associated with a merchant game, a merchant offer, and a location of the merchant; (b) receiving, by the gaming rewards computer system, a game request message from a cardholder computing device associated with the cardholder, wherein the game request message includes a cardholder locator identifying a location of the cardholder; (c) providing the merchant game to the cardholder computing device when the cardholder location is within a pre-defined distance of the merchant location; (d) receiving, by the gaming rewards computer system, a game result message for the merchant game; (e) providing the merchant offer to the cardholder computing device based, at least in part, on the game result message; (f) receiving game configuration data by the gaming rewards computer system, wherein the game configuration data include data associated with at least one of a game type of the merchant game, a reward type of the merchant game, a game occurrence rate of the merchant game, and a reward redemption type of the merchant game; (g) providing the merchant offer to the cardholder computing device based on the game type of the merchant game; (h) providing the merchant offer to the cardholder computing device based on the reward type of the merchant game; (i) redeeming the merchant offer by the cardholder based, at least in part, on the reward redemption type of the merchant game; (j) identifying the cardholder location using geo-location features of the cardholder computing device; (k) identifying the cardholder location by scanning a merchant identifier at the merchant location, wherein the merchant identifier is one of a barcode and an RFID tag; (l) receiving the game result message wherein the game result message indicates that the cardholder has achieved a positive result for the merchant game, wherein the positive result is achieved by satisfying a pre-determined threshold associated with the merchant game; (m) receiving the game result message wherein the pre-determined threshold is associated with the game type of the merchant game; and (n) providing the merchant offer to the cardholder wherein the merchant offer is based on a card type associated with a payment card of the cardholder.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to providing location-based merchant games and merchant offers based upon the results of the location-based merchant games.

FIG. 1 is a schematic diagram illustrating an example multi-party transaction card industry system 20 for enabling ordinary payment-by-card transactions, including transactions using merchant offers, in which merchants 24 and card issuers 30 do not need to have a one-to-one special relationship. Typical financial transaction institutions provide a suite of interactive, online applications to both current and prospective customers. For example, a financial transactions institution may have a set of applications that provide informational and sales information on their products and services to prospective customers, as well as another set of applications that provide account access for existing cardholders.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor." As described herein, cardholder 22 may tender payment using merchant offers or merchant offers received from, for example, gaming rewards computer system 112. Gaming rewards computer system 112 may further be used, as described below, to serve merchant games to cardholder 22. Upon achieving a particular game result, cardholder 22 may receive merchant offers from gaming rewards computer system 112 which may be used in the transaction initiated by cardholder 22.

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described below in more detail, gaming rewards computer system 112 may be used to store merchant games, serve merchant games, receive and process game result messages, and provide merchant offers to cardholder 22. Although the systems described herein are not intended to be limited to facilitate such applications, the systems are described as such for exemplary purposes.

Figure 2:
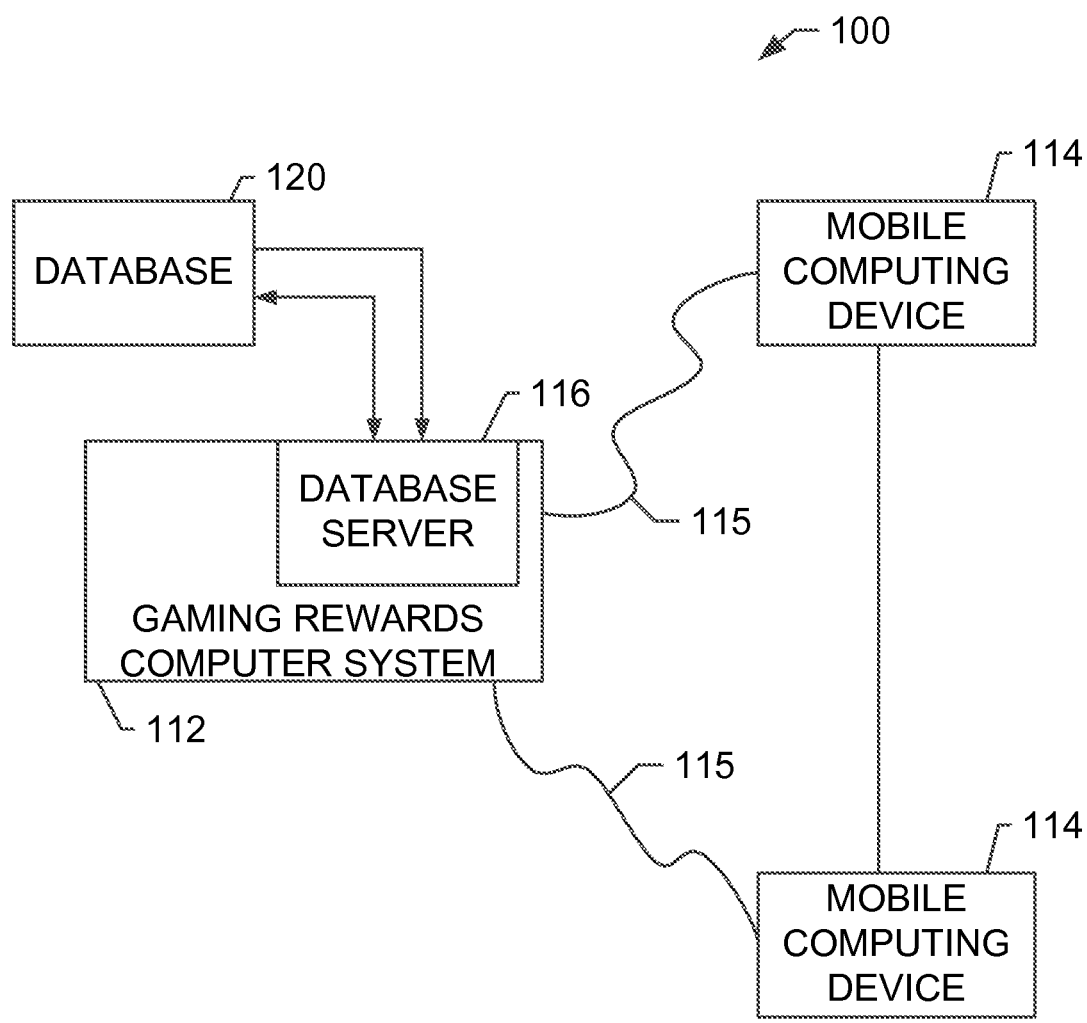

FIG. 2 is a simplified block diagram of an example system 100 used to provide an offer associated with a merchant from a gaming rewards computer system to a cardholder engaging in a game using a mobile computing device in accordance with one example embodiment of the present disclosure. In the example embodiment, system 100 is used for storing merchant game data for the merchant, receiving a game request message from a cardholder computing device associated with the cardholder, providing the merchant game to the cardholder computing device when the cardholder location is within a pre-defined distance of the merchant location, receiving a game result message for the merchant game, and providing the merchant offer to the cardholder computing device based at least in part on the game result message, as described herein. In other embodiments, the applications may reside on other computing devices (not shown) communicatively coupled to system 100, and may provide merchant games and merchant offers using system 100.

More specifically, in the example embodiment, system 100 includes a gaming rewards computer system 112, and a plurality of client sub-systems, also referred to as mobile computing devices 114, connected to gaming rewards computer system 112. In the example embodiment, mobile computing devices 114 are used by cardholder 22 (shown in FIG. 1) and may accordingly be referred to as cardholder computing device 114. In one embodiment, mobile computing devices 114 are computers including a web browser, such that gaming rewards computer system 112 is accessible to mobile computing devices 114 using the Internet. Mobile computing devices 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Mobile computing devices 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on gaming rewards computer system 112 and can be accessed by potential users at one of mobile computing devices 114 by logging onto gaming rewards computer system 112 through one of mobile computing devices 114. In an alternative embodiment, database 120 is stored remotely from gaming rewards computer system 112 and may be non-centralized.

Database 120 may include a single database having separated sections or partitions, or may include multiple databases, each being separate from each other. Database 120 may store transaction data generated over the processing network including data relating to merchants, account holders, prospective customers, issuers, acquirers, and/or purchases made. Database 120 may also store account data including at least one of a cardholder name, a cardholder address, an account number, other account identifiers, and transaction information. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, one of mobile computing devices 114 may be associated with acquirer bank 26 (shown in FIG. 1) while another one of mobile computing devices 114 may be associated with issuer bank 30 (shown in FIG. 1). Gaming rewards computer system 112 may be associated with interchange network 28. In the example embodiment, gaming rewards computer system 112 is associated with a network interchange, such as interchange network 28, and may be referred to as an interchange computer system. Gaming rewards computer system 112 may be used for processing transaction data. In addition, mobile computing devices 114 may include a computer system associated with at least one of an online bank, a bill payment outsourcer, an acquirer bank, an acquirer processor, an issuer bank associated with a transaction card, an issuer processor, a remote payment system, customers and/or billers.

Figure 3:
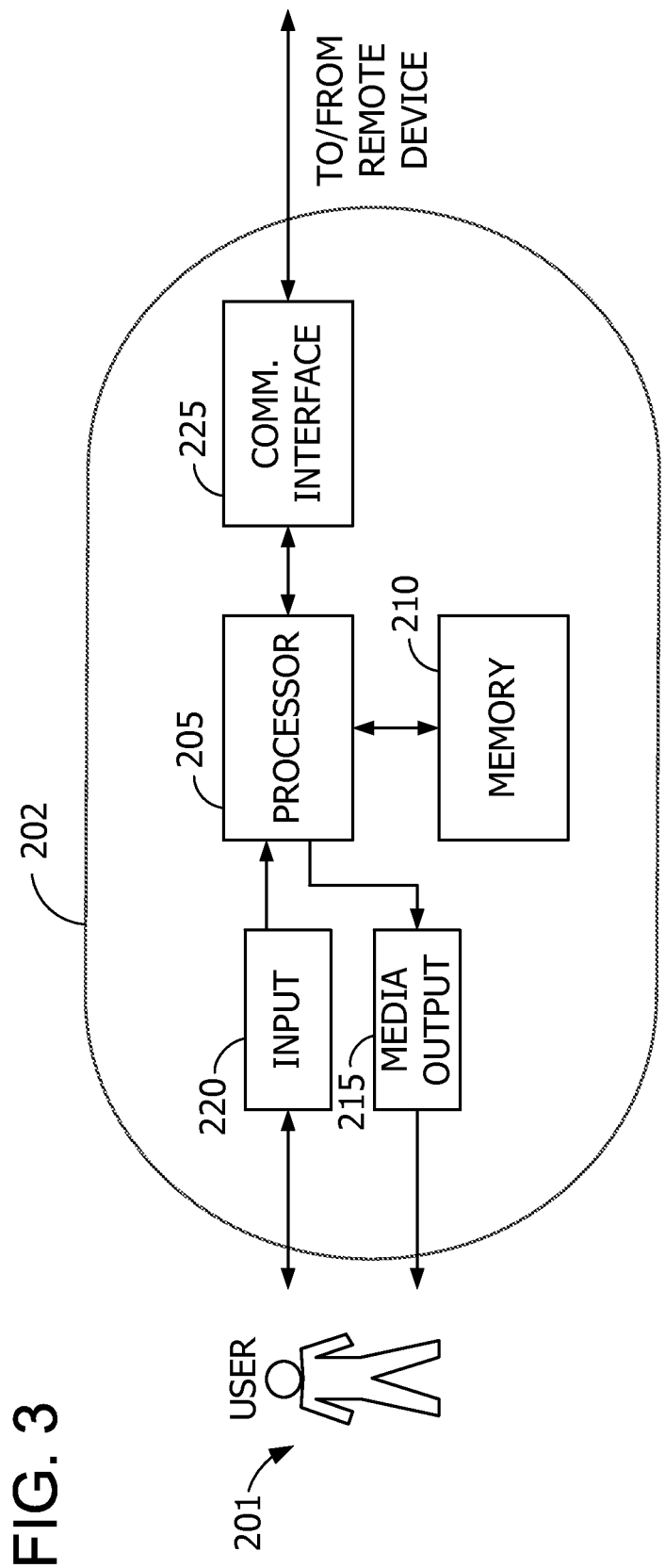

FIG. 3 illustrates an example configuration of a user system 202 operated by a user 201, such as cardholder 22 (shown in FIG. 1). User system 202 may include, but is not limited to, mobile computing device 114. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a camera, a touch screen, a gyroscope, an accelerometer, a position detector, or an audio input device. Input device 220 may be used to receive input such as barcodes, QR codes, and RFID information. A single component such as a touch screen may function as both an output device of media output component 215 and input device 220. User system 202 may also include a communication interface 225, which is communicatively couplable to a remote device such as gaming rewards computer system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WI-MAX). Communication interface 225 may further include, for example, geo-locator sensors and systems including, for example and without limitation, global positioning sensors, WiFi positioning sensors, and proximity sensing methods protocols such as Bluetooth™.

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from gaming rewards computer system 112. A client application allows user 201 to interact with a server application from gaming rewards computer system 112.

Figure 4:
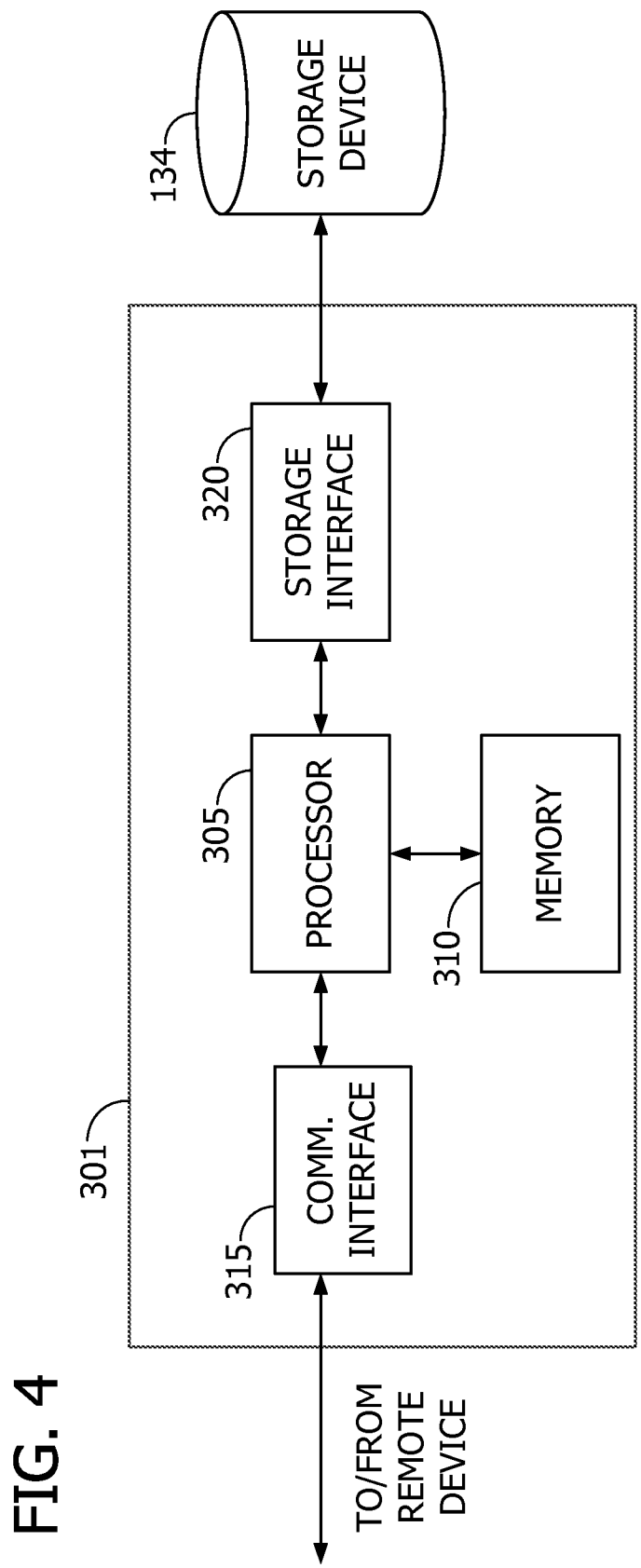

FIG. 4 illustrates an example configuration of a server system 301 such as gaming rewards computer system 112 (shown in FIG. 2). In the example embodiment, server system 301 stores merchant game data, receives game request messages, provides merchant games, receives game result messages, and provides merchant offers, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from mobile computing device 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
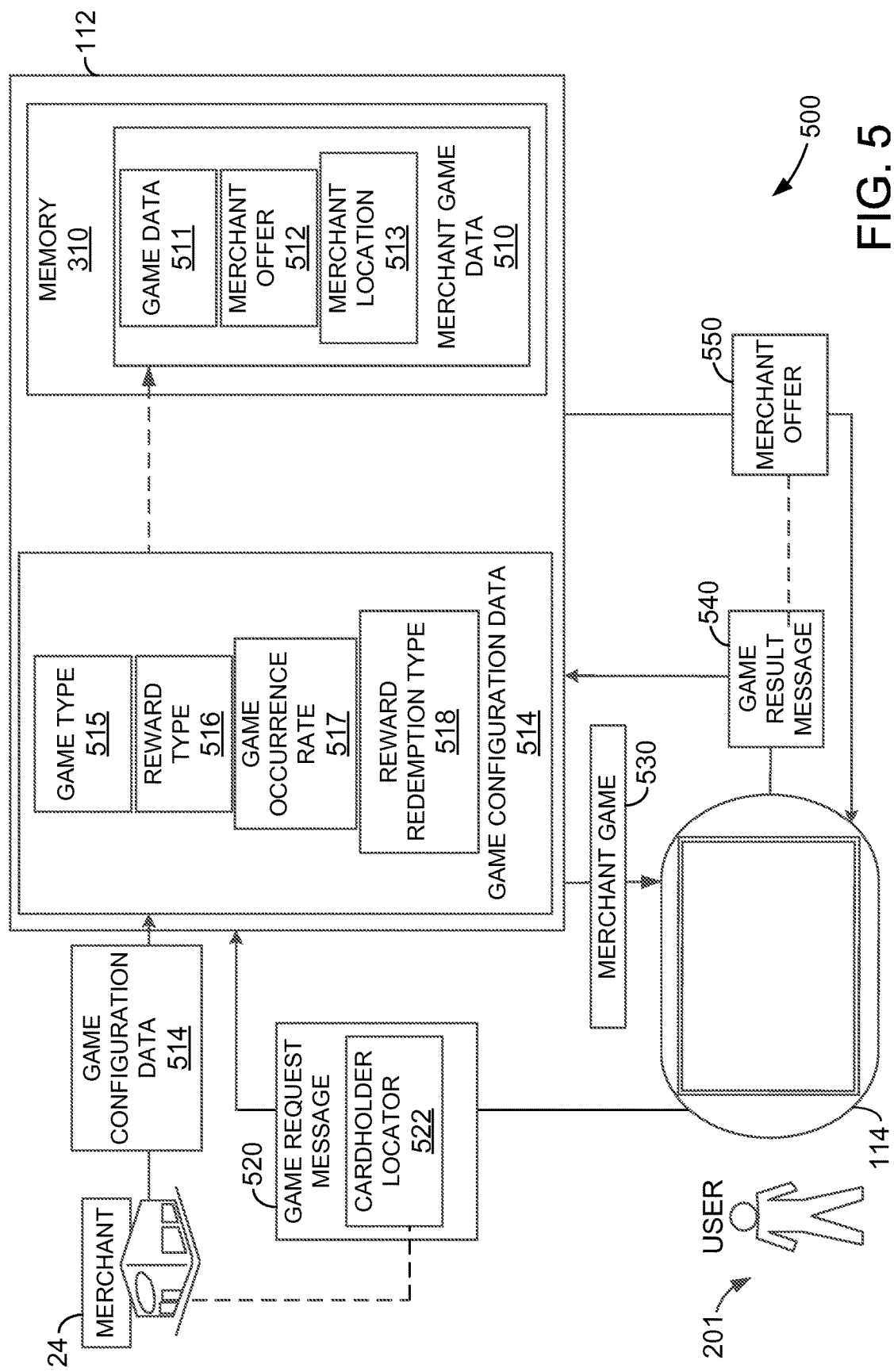

FIG. 5 is a data flow diagram 500 of the gaming rewards computer system 100 (shown in FIG. 2). Gaming rewards computer system 112 stores merchant game data 510 at memory 310. Merchant game data 510 includes game data 511, merchant offers 512, and merchant locations 513. Game data 511 includes game data related to a particular merchant game. Game data 511 may accordingly include files, binaries, or other executable data that may be run by a computing device such as mobile computing device 114. Merchant offer 512 includes information related to a merchant offer associated with a particular merchant game. Merchant location 513 includes information related to the physical location of a merchant 24 associated with merchant game data 510. Merchant location 513 may additionally include a minimum pre-determined distance associated with merchant location 513 for user 201 to receive game data 511. In other words, merchant location 513 may define a radius or an area in which user 201 may be able to receive game data 511. Merchant game data 510 may additionally include additional data including, for example and without limitation, a merchant identifiers, a merchant category, and a merchant offer category. Merchant game data 510 may include information such as shown below (Table 1):

TABLE 1

| Merchant Identifier | Merchant Game | Merchant Offer | Merchant Location | Minimum Distance | Merchant Category |
|---|---|---|---|---|---|
| John's Jeans | Jean Price Guessing Game | 10% Discount | 42.2, −87.5 | Within 300 yards | Apparel |
| Tom's Toy Shoppe | Toy Quest | Promotional Toy | 42.1, −87.6 | Within 400 yards | Toys |
| Ernie's Electronic | Electronics Trivia | $5 Rebate | 42.3, −87.6 | Within 350 yards | Electronics |

In the example of Table 1, merchant location 513 is indicated with latitude and longitude coordinates. Alternately, any suitable method of identifying a location may be used including GPS coordinates and postal addresses. In Table 1, one game data 511 and one merchant offer 512 are indicated for each merchant identifier. In alternate examples, a plurality of game data 511 and merchant offers 512 may be stored for a particular merchant identifier. As a result, multiple game data 511 may be associated with a particular merchant 24 and multiple merchant offers 512 may be associated with each game data 511.

Gaming rewards computer system 112 additionally stores game configuration data 514. Game configuration data 514 includes, for example and without limitation, game type 515 of game data 511, reward type 516 of game data 511, game occurrence rate 517 of game data 511, and reward redemption type 518 of game data 511. Game type 515 specifies the category, format, or style of game data 511. Game types 515 may include, for example and without limitation, adventure games, strategy games, knowledge games, trivia games, price guessing games, competitive games, and sports games. Reward type 516 of game data 511 specifies the type of reward or offer associated with game data 511. Reward type 516 may include, for example and without limitation, a discount, a rebate, a promotional product available with purchase, and rewards points for use in a rewards program. Game occurrence rate 517 may specify a frequency with which game data 511 may be played. For example, some game data 511 may only be played once per visit while other game data 511 may be played repeatedly while user 202 is in or near merchant 24. Reward redemption type 518 may specify the terms and conditions of the redemption of the offer. For example, the reward redemption type may specify that the reward or offer may be redeemed on purchase, without purchase, or on a particular date. Game configuration data 514 may include data such as shown below (Table 2):

TABLE 2

| Merchant Identifier | Game Type | Reward Type | Game Occurrence Rate | Reward Redemption Type |
|---|---|---|---|---|
| John's Jeans | Price Guessing | Discount | Once Per Visit | Only Available on Purchase Now |
| Tom's Toy Shoppe | Adventure Game | Promotional Product Rebate | Unlimited Play | Available At Any Time |
| Ernie's Electronic | Trivia Game | | Twice Per Visit | Redeemable in January only |

Table 2 correlates to Table 1 and accordingly the information in Table 2 corresponds to the games shown in Table 1. Game configuration data 514 is used to determine whether and how to present merchant games 530 to mobile computing device 114. For example, user 201 can only play Jean Price Guessing Game once per visit but can play Toy Quest as many times as desired. Further, game configuration data is also used to determine when merchant offers 550, as described below, may be redeemed. For example, the discount available on successfully playing Jean Price Guessing Game may only be redeemed if user 201 redeems at the time that the game is played. Additionally, game configuration data 514 may be used in combination with user information available on mobile computing device 114 to provide merchant games 530 matching preferences of user 114.

Gaming rewards computer system 112 also receives game request message 520 from mobile computing device 114. Game request message 520 represents a request from mobile computing device 114 for any game data 511 to be retrieved from merchant game data 510. As previously described, game data 511 are location-based. Game data 511 are each associated with merchant location 513 and a pre-determined minimum distance. Accordingly, game data 511 are served or provided to mobile computing devices 114 associated with a location within the pre-determined minimum distance from merchant location 513. This allows game data 511 to be served when cardholder 201 is near or at merchant 24 and accordingly may facilitate transactions or affinity to merchant 24. Game request message 520 includes cardholder locator 522 identifying the location of cardholder, cardholder 201. In other words, when cardholder 201 is proximate to merchant 24, cardholder locator 522 in game request message 520 indicates that cardholder 201 is proximate to merchant 24. Mobile computing device 114 may determine cardholder locator 522 by identifying the cardholder location. In one example, the cardholder location may be identified by using geo-location features of mobile computing device 114. For example, mobile computing devices 114 may include global positioning system ("GPS") functions. Alternately, mobile computing devices 114 may use WiFi positioning, radio frequency location, or any other method of geo-location available. Additionally, mobile computing devices 114 may use proximity sensing methods using communication protocols such as Bluetooth™, or any other method of geo-location available to mobile computing devices 114. In some examples, communications beacons associated with the merchant may be used to determine the location of mobile computing device 114. In one example, a beacon may be located in each merchant 24 and the beacon may communicate with mobile computing devices 114 to determine proximities. Accordingly, in further examples where user 201 is in a location with multiple beacons associated with multiple merchants 24 (e.g., a shopping mall), a position of mobile computing device 114 may be determined based upon relative position to a plurality of beacons. As a result, mobile computing device 114 may transmit cardholder locator 522 in game request message 520 and cause the receipt of merchant game 530 associated with the beacon of merchant 24 to which mobile computing device 114 is most proximate. Alternately, mobile computing device 114 may identify the cardholder location by scanning a merchant identifier at the merchant location. The merchant identifier may be any merchant identifier including, for example and without limitation, a barcode, an RFID tag, a quick response code ("QR Code"), a universal resource locator ("URL"), or any other location identifier that may be scanned by mobile computing device 114. In the example of Table 1, merchant location 513 was indicated with latitude and longitude coordinates. Cardholder locator 522 may involve the use of latitude and longitude coordinates to identify a location of mobile computing device 114 or any other appropriate method of location including, for example and without limitation, GPS coordinates, addresses, or determined distances from merchant 24.

Gaming rewards computer system 112 processes game request message 520 and determines at least one game data 511 and merchant offer 512 associated with cardholder locator 522. Gaming rewards computer system 112 determines game data 511 and merchant offer 512 by identifying merchant game data 510 wherein cardholder locator 522 is within the minimum distance from merchant location 513. As described above, in some examples, multiple game data 511 and merchant offers 512 may be associated with merchant 24. Alternately, mobile computing device 114 may be physically located in a place that is within the minimum distance of multiple merchants 24. As described below, in such circumstances, multiple game data 511 may be playable from such locations by cardholder 201 based on customer selection.

Upon determining game data 511 and merchant offer 512, gaming rewards computer system 112 provides merchant game 530 to mobile computing device 114. In some examples, providing merchant game 530 to the mobile computing device 114 represents uploading files, binaries, or other data associated with merchant game 530 to mobile computing device 114. In other examples, providing merchant game 530 to mobile computing device 114 represents sending a signal identifying appropriate merchant game 530 to mobile computing device 114. In such examples, mobile computing device 114 may have already downloaded the files, binaries, or other data associated with merchant game 114. Alternately, mobile computing device 114 may download such files, binaries, or other data from a secondary gaming server associated with gaming rewards computer system 112. In all examples, providing merchant game 530 to mobile cardholder computing device 114 further represents generally making merchant game 530 available to mobile computing device 114. In at least some examples, cardholder locator 522 may indicate that cardholder 201 and mobile computing device 114 are proximate to a plurality of merchants 24. In such examples, merchant games 530 for each proximate merchant 24 may be provided.

Using mobile computing device 114, cardholder 201 participates or plays with merchant game 530. As described below, merchant game 530 may be associated with any of a variety of game types 515, styles, and formats. In at least some examples, the content of merchant game 530 is associated with characteristics of merchant 24. For example, at least some merchant games 530 may include game elements referring to products sold by merchant 24 and the prices associated with the products. In a first example, merchant game 530 may be a price guessing game where cardholder 201 guesses the price of products sold by merchant 24. The goal in this merchant game 530 is for cardholder 201 to guess the price as accurately as possible without exceeding the price of the product. Cardholder 201 may play this game for a plurality of products to become increasingly familiar with products sold by merchant 24 and their associated prices.

Merchant game 530 may be played by user 201 until a game result. The game result may include, for example and without limitation, a total amount of points scored in merchant game 530, a level achieved in merchant game 530, an indication of whether merchant game 530 was won or lost, and any other result that may be associated with the playing of merchant game 530. In the example of the price guessing game, cardholder 201 may achieve a game result when cardholder 201 has guessed prices for a predetermined amount of products. Accordingly, the game result may be the aggregate accuracy of the guesses of the products, the accuracy for each guess of the price of the products, or any score or determination based upon the guesses.

Gaming rewards computer system 112 receives a game result message 540 for merchant game 530 from mobile computing device 114. Game result message 540 includes an indication of the game result, as described above. For example, game result message 540 may include, for example and without limitation, a total amount of points scored in merchant game 530, a level achieved in merchant game 530, an indication of whether merchant game 530 was won or lost, and any other result that may be associated with the playing of merchant game 530. Further, game result message 540 may indicate whether the cardholder 201 has achieved a positive result for merchant game 530. The positive result is achieved by satisfying a pre-determined threshold associated with merchant game 530. For example, the pre-determined threshold may be a minimum amount of points required to be scored to obtain the positive result. The pre-determined threshold may be specific to each merchant game 530. For example, for a variety of merchant games, different minimum amounts of points may be required to achieve a positive result.

Based at least in part on the game result message, gaming rewards computer system 112 determines a merchant offer 550 to provide to mobile computing device 114 and provides merchant offer 550 to mobile computing device 114. In at least one example, merchant offer 550 is provided when cardholder 201 achieves the pre-determined threshold on merchant game 530 and accordingly achieves a positive result. In alternate examples, merchant offer 550 may vary depending upon game result message 540. For example, as cardholder 201 achieves increasing point scores in merchant game 530, gaming rewards computer system 112 may provide increasing levels of merchant offers 550. In the example of the price guessing game, a first guess that is 10% from the correct guess may be associated with merchant offer 550 of a 1% reduction in the price of products while a second guess that is 5% from the correct guess may be associated with merchant offer 550 of a 3% reduction in the price of products. Accordingly, more accurate guesses (corresponding to better game results) allow cardholder 201 to receive better merchant offers 550.

Merchant offer 550 may be determined and provided by gaming rewards computer system 112 based upon game type 515 of merchant game 530 as indicated in game configuration data 514 stored at memory 310 of gaming rewards computer system 112. In another example, merchant offer 550 may be determined and provided by gaming rewards computer system 112 based upon reward type 516 of merchant game 530 as indicated in game configuration data 514 stored at memory 310 of gaming rewards computer system 112. Merchant offer 550 may also be determined and provided by gaming rewards computer system 112 based upon a card type associated with the payment card of cardholder 201. For example, for the same game result message 540, a cardholder 201 may receive different merchant offers 550 depending on whether cardholder 201 uses a debit card or a credit card. Alternately, merchant offer 550 may be determined based upon the bank or brand associated with the payment card or payment method of cardholder 201. In one example, merchant 24 may be associated with a store-brand card and may provide an enhanced offer when cardholder 201 uses the store-brand card when redeeming merchant offer 550. In another example, merchant 24 may provide different levels of offers depending on the bank or brand associated with the payment card used by cardholder 201 during the redemption of merchant offer 550. In a further example, merchant offer 550 may also vary if cardholder 201 uses other forms of payment including cash, checks, or electronic currency. Depending upon the business and operational goals of merchant 24 and the gaming rewards system implemented on gaming rewards computer system 112, merchant offers 550 may vary in any of the ways described.

Depending upon reward redemption type 518 of merchant game 530, as indicated in game configuration data 514, cardholder 201 may redeem merchant offer 550. For example, if reward redemption type 518 requires that merchant offer 550 may only be redeemed with purchase, cardholder 201 can only redeem merchant offer 550 with the purchase of a product. Alternately, reward redemption type 518 may specify that merchant offer 550 may only be redeemed within a specific time period. In other examples, reward redemption type 518 may require that merchant offer 550 only be redeemed during the present visit of cardholder 201 to merchant 24. In these examples, cardholder 201 may be incentivized to make a purchase of products or lose the benefit accrued during the play of merchant game 530.

In the example embodiment, redemption is facilitated by a computer system associated with payment network 28. In a first example, when cardholder 201 initiates a payment transaction as described above at, for example, a POS device, cardholder 201 may tender payment along with merchant offer 550. Merchant offer 550 may be included by providing, for example and without limitation, offer formats including a code, coupon, or barcode. Such offer formats may be entered manually at the POS device, scanned into the POS device from the mobile computing device 114, or transmitted from the mobile computing device 114 to the POS device using any suitable communication protocol. Accordingly, as merchant offer 550 is tendered, it may be included in the "additional transaction data" transferred among the parties of the transaction such as merchant bank 26, interchange network 28, and issuer bank 30 (shown in FIG. 1). Accordingly, such parties may receive any pertinent information related to merchant offer 550 including, for example and without limitation, a frequency of cardholder 201 playing merchant game 530, a history of game result messages 540, merchant game data 510, and game configuration data 514.

In a second example, when cardholder 201 initiates a payment transaction as described above at, for example, a POS device, merchant offer 550 may automatically be included when cardholder 201 tenders payment. In such examples, when cardholder 201 receives merchant offer 550, merchant offer 550 is also associated with a profile associated with cardholder 201 at a computing device associated with at least one of merchant 24, merchant bank 26, interchange network 28, and issuer bank 30. Accordingly, when cardholder 201 initiates a transaction, any such computing device associated with the parties to the transaction may process the transaction to include merchant offer 550. Such processing may include a reduction in the value of the transaction pursuant to merchant offer 550, a reduction in the interchange rate or processing rate associated with the transaction, and a message sent to merchant 24 at a merchant computing system advising that cardholder 201 may receive an additional benefit based on merchant offer 550 such as promotional merchandise.

Figure 6:
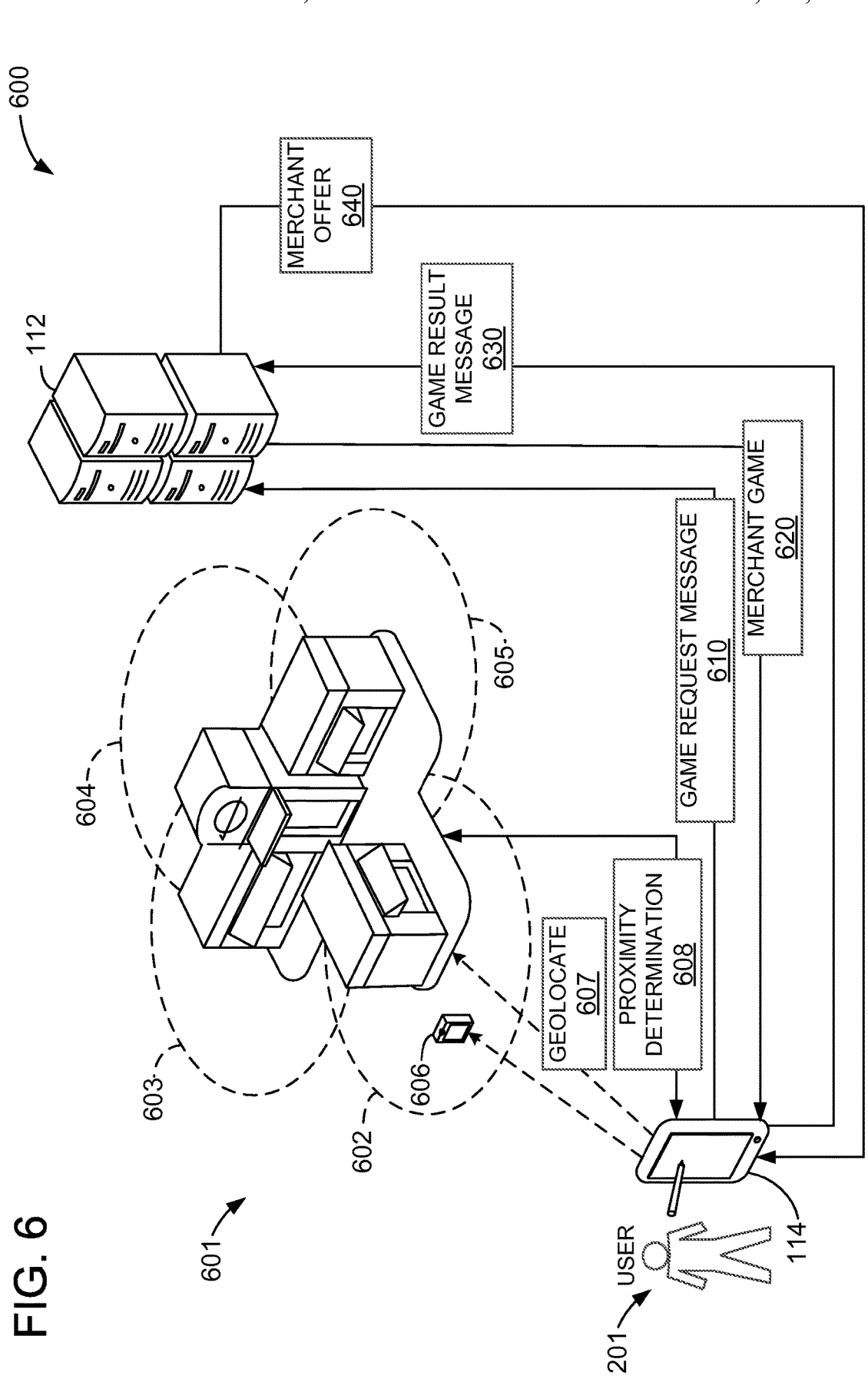

FIG. 6 is a data flow diagram 600 of gaming rewards computer system 100 (shown in FIG. 2) illustrating cardholder 201 receiving merchant game 530 based upon proximity to merchant 602. In diagram 600, a plurality of merchants 601 are in the area of cardholder 201. As cardholder 201 approaches any merchant 601, mobile computing device 114 may make a proximity determination 608. As indicated above, proximity determination 608 may be made based upon geo-location 607 using any geo-location sensor or feature of mobile computing device 114 including, for example, GPS and WiFi positioning sensors. Alternately, mobile computing device 114 may make proximity determination 608 based upon scanning 606 a barcode, QR code, or identifying an RFID tag.

Diagram 600 illustrates that as cardholder 201 moves around diagram 600, mobile computing device 114 may make additional proximity determinations 608. Accordingly, mobile computing device 114 may send game request message 610 to gaming rewards computer system 112 including cardholder locator 522 (shown in FIG. 5) based upon the location of cardholder 201 with respect to each merchant 601. As described above, game request message 610 further determines merchant game 620 received from gaming rewards computer system 112 by mobile computing device 114 and further determines the possible game result message 630 submitted to gaming rewards computer system 112 and merchant offer 640 received in response to game result message 630. Accordingly, diagram 600 illustrates how location of cardholder 201 determines receipt of location-based gaming and any merchant rewards or offers associated with such location-based gaming.

Figure 7:
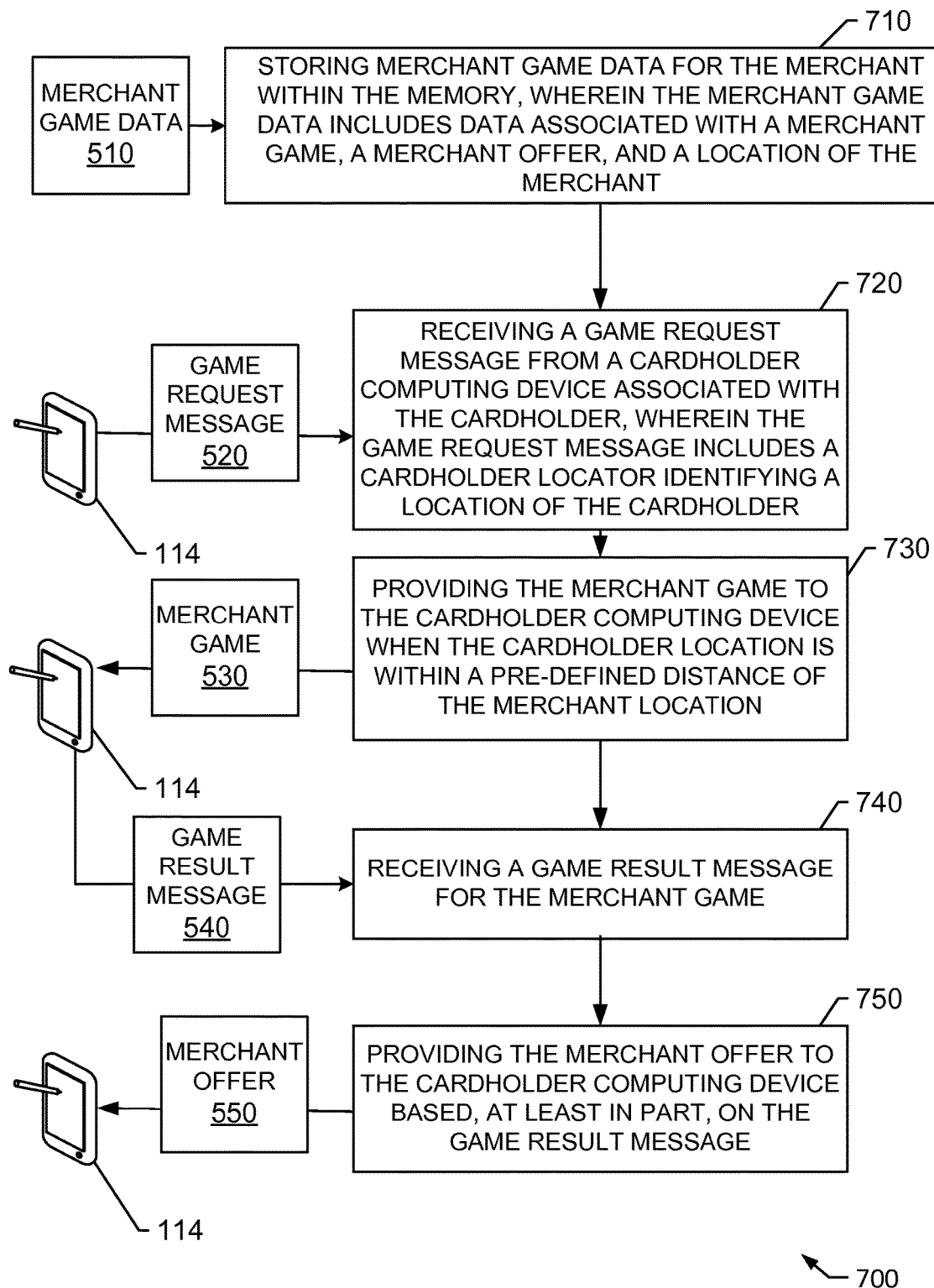

FIG. 7 is a simplified diagram of an example method 700 of providing an offer associated with a merchant from a gaming rewards computer system to a cardholder engaging in a game using the gaming rewards computer system 112 (shown in FIG. 2). Gaming rewards computer system 112 stores 710 merchant game data for the merchant within the memory, wherein the merchant game data includes data associated with a merchant game, a merchant offer, and a location of the merchant. Storing 710 represents gaming rewards computer system 112 storing merchant game data 510 in memory 310 (shown in FIG. 4).

Gaming rewards computer system 112 also receives 720 a game request message from a cardholder computing device associated with the cardholder, wherein the game request message includes a cardholder locator identifying a location of the cardholder. Receiving 720 represents gaming rewards computer system 112 receiving game request message 520 from mobile computing device 114.

Gaming rewards computer system 112 further provides 730 the merchant game to the cardholder computing device when the cardholder location is within a pre-defined distance of the merchant location. Providing 730 represents gaming rewards computer system 112 making merchant game 530 available to mobile computing device 114.

Gaming rewards computer system 112 additionally receives 740 a game result message for the merchant game. Receiving 740 represents gaming rewards computer system 112 receiving game result message 540 from mobile computing device 114.

Gaming rewards computer system 112 also provides 750 the merchant offer to the cardholder computing device based, at least in part, on the game result message. Providing 750 represents gaming rewards computer system 112 sending merchant offer 550 to mobile computing device 114.

Figure 8:
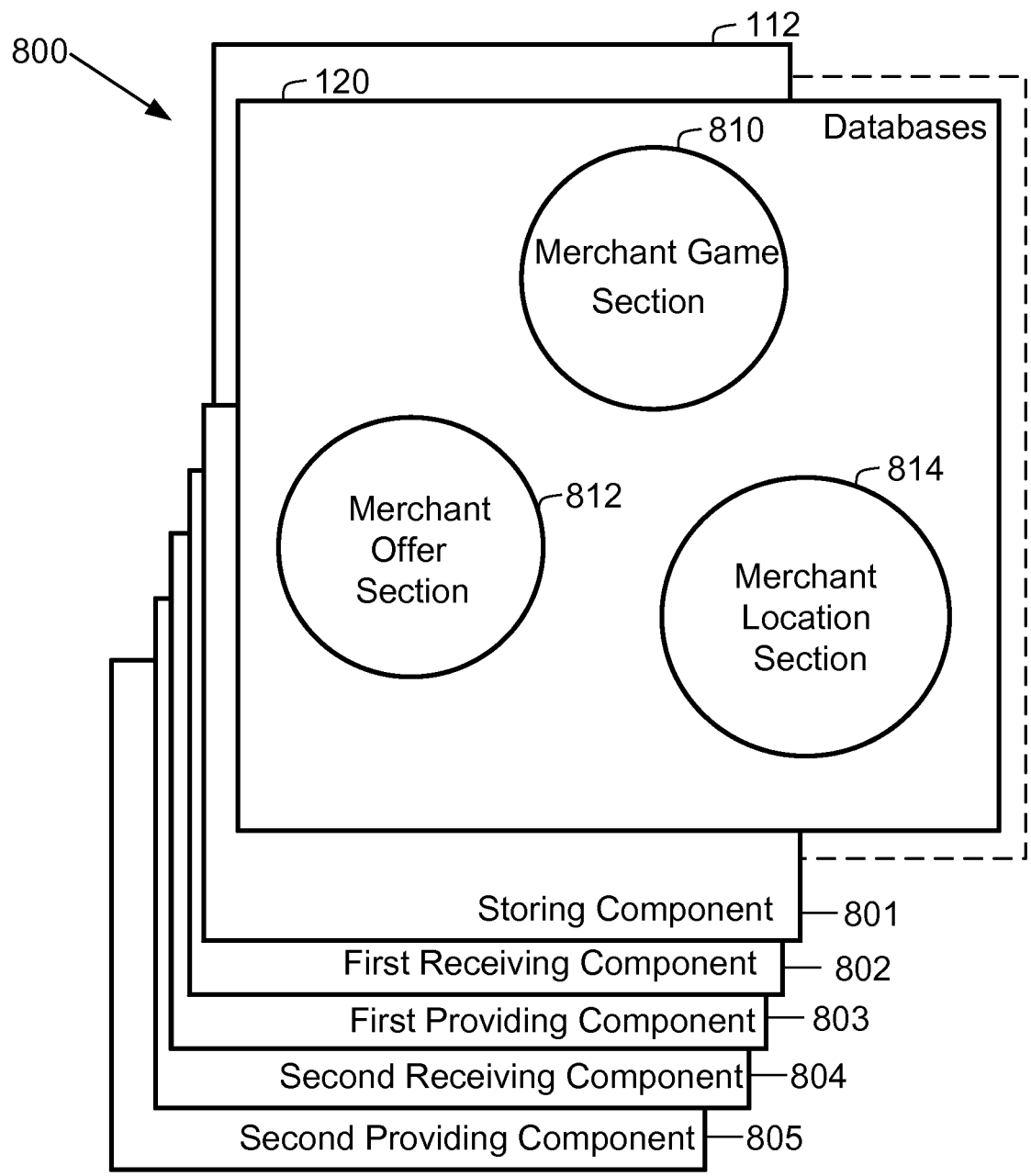

FIG. 8 is a diagram 800 of components of one or more example computing devices that may be used in the environment shown in FIGS. 5 and 6. FIG. 8 further shows a configuration of databases including at least database 120 (shown in FIG. 1). Database 120 is coupled to several separate components within gaming rewards computer system 112, which perform specific tasks.

Gaming rewards computer system 112 includes a storing component 801 for storing merchant game data for the merchant within the memory. Gaming rewards computer system 112 also includes a first receiving component 802 for receiving a game request message from a cardholder computing device associated with the cardholder, wherein the game request message includes a cardholder locator identifying a location of the cardholder. Gaming rewards computer system 112 additionally includes a first providing component 803 for providing the merchant game to the cardholder computing device when the cardholder location is within a pre-defined distance of the merchant location. Gaming rewards computer system 112 additionally includes a second receiving component 804 for receiving a game result message for the merchant game. Gaming rewards computer system 112 also includes a second providing component 805 for providing the merchant offer to the cardholder computing device based, at least in part, on the game result message.

In an exemplary embodiment, database 120 is divided into a plurality of sections, including but not limited to, a merchant game section 810, a merchant offer section 812, and a merchant location section 814. These sections within database 120 are interconnected to update and retrieve the information as required.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for providing an offer associated with a merchant to a cardholder engaging in a game, said method implemented using a gaming rewards computer system in communication with a memory, said method comprising:
    storing merchant game data for the merchant within the memory, wherein the merchant game data includes game data associated with a merchant game application, a location of the merchant, and a predetermined distance associated with the merchant location;
    receiving, by the gaming rewards computer system, a game request message from a cardholder computing device associated with the cardholder, wherein the game request message includes a cardholder locator identifying a location of the cardholder, the cardholder locator determined by the cardholder computing device based on at least one of GPS functionality, WiFi positioning, radio frequency location, proximity sensing, and a merchant identifier scanned by the cardholder computing device;
    comparing, using the gaming rewards computer system, the cardholder locator in the game request message with the merchant location stored in the memory to determine whether the cardholder computing device is located within the predetermined distance of the merchant location;
    retrieving from the memory, based on a determination that the cardholder computing device is within the predetermined distance of the merchant location, by the gaming rewards computer system, the game data;
    uploading the game data to the cardholder computing device to cause the merchant game application to be installed on the cardholder computing device;
    receiving from the cardholder computing device, by the gaming rewards computer system, a game result message, the game result message generated in response to the cardholder playing the merchant game application and including a game result achieved by the cardholder;
    determining, by the gaming rewards computer system, based on at least one of i) the game result in the game result message, ii) a game type of the merchant game application, and iii) a characteristic of a payment card of the cardholder, a merchant offer associated with a product offered for purchase by the merchant;
    transmitting, by the gaming rewards computer system, the merchant offer to the cardholder computing device in response to receiving the game result message to cause the merchant offer to be displayed on the cardholder computing device; and
    associating the merchant offer with a profile of the cardholder at an interchange network computing device associated with an interchange network, wherein, when the cardholder initiates a transaction with the merchant over the interchange network using the payment card, the interchange network computing device associated with the interchange network automatically applies the merchant offer to the transaction, and wherein the interchange network computing device is configured to process payment card transactions including the transaction initiated with the merchant over the interchange network using a set of proprietary communication standards for the exchange of transaction data and the settlement of funds between financial institutions that are members of the interchange network.

2. The method of claim 1, further comprising:
    storing game configuration data within the memory, wherein the game configuration data include data associated with at least one of the game type of the merchant game application, a reward type of the merchant game application, a game occurrence rate of the merchant game application, and a reward redemption type of the merchant game application.

3. The method of claim 2, further comprising:
    providing the merchant offer to the cardholder computing device based on the reward type of the merchant game application.

4. The method of claim 2, further comprising:
    redeeming the merchant offer by the cardholder based, at least in part, on the reward redemption type of the merchant game application.

5. The method of claim 1, wherein the merchant identifier is one of a barcode and an RFID tag.

6. The method of claim 1, further comprising receiving the game result message wherein the game result message indicates that the cardholder has achieved a positive result for the merchant game application, wherein the positive result is achieved by satisfying a pre-determined threshold associated with the merchant game application.

7. The method of claim 6, further comprising receiving the game result message wherein the pre-determined threshold is associated with the game type of the merchant game application.

8. The method of claim 1, further comprising:
    receiving, by the gaming rewards computer system, a second game request message from the cardholder computing device, wherein the second game request message includes a second cardholder locator identifying a second location of the cardholder;
    comparing, using the gaming rewards computer system, the second cardholder locator in the game request message with a second merchant location stored in the memory to determine whether the cardholder computing device is located proximate the second merchant location;
    retrieving from the memory, based on a determination that the cardholder computing device is proximate the second merchant location, by the gaming rewards computer system, second game data, wherein the second game data is different than the game data;
    uploading the second game data to the cardholder computing device to cause a second merchant game application to be installed on the cardholder computing device;
    receiving from the cardholder computing device, by the gaming rewards computer system, a second game result message, the second game result message generated in response to the cardholder playing the second merchant game application and including a second game result achieved by the cardholder, and determining, by the gaming rewards computer system, based on a combination of i) the second game result in the second game result message, ii) a second game type of the second merchant game application, and iii) the characteristic of the payment card of the cardholder, a second merchant offer associated with a product offered for purchase by the second merchant, wherein the second merchant offer is different than the merchant offer.

9. The method of claim 1, wherein determining a merchant offer comprises determining the merchant offer based at least in part on whether the payment card is a debit card or a credit card.

10. The method of claim 1, wherein determining a merchant offer comprises determining the merchant offer based at least in part on a bank associated with the payment card.

11. The method of claim 1, wherein determining a merchant offer comprises determining the merchant offer based at least in part on whether the payment card is a store-brand card associated with the merchant.

12. A gaming rewards computer system for providing an offer associated with a merchant to a cardholder engaging in a game, comprising:
a processor;
a memory coupled to said processor, said processor configured to:
store merchant game data for the merchant within the memory, wherein the merchant game data includes game data associated with a merchant game application, a location of the merchant, and a predetermined distance associated with the merchant location;
receive a game request message from a cardholder computing device associated with the cardholder, wherein the game request message includes a cardholder locator identifying a location of the cardholder, the cardholder locator determined by the cardholder computing device based on at least one of GPS functionality, WiFi positioning, radio frequency location, proximity sensing, and a merchant identifier scanned by the cardholder computing device;
compare, using the gaming rewards computer system, the cardholder locator in the game request message with the merchant location stored in the memory to determine whether the cardholder computing device is located within the predetermined distance of the merchant location;
retrieve from the memory, based on a determination that the cardholder computing device is within the predetermined distance of the merchant location, by the gaming rewards computer system, the game data;
upload the game data to the cardholder computing device to cause the merchant game application to be installed on the cardholder computing device;
receive from the cardholder computing device a game result message, the game result message generated in response to the cardholder playing the merchant game application and including a game result achieved by the cardholder;
determine, by the gaming rewards computer system, based on at least a characteristic of a payment card of the cardholder, a merchant offer associated with a product offered for purchase by the merchant, wherein for the same game result message, a first merchant offer is determined when the payment card is a debit card, and a second merchant offer is determined when the payment card is a credit card, the first merchant offer different from the second merchant offer, and wherein the first merchant offer and the second merchant offers both include a price reduction or some other value;
transmit, by the gaming rewards computer system, the merchant offer to the cardholder computing device in response to receiving the game result message to cause the merchant offer to be displayed on the cardholder computing device; and
associate the merchant offer with a profile of the cardholder such that when the cardholder initiates a transaction with the merchant over an interchange network using the payment card, the merchant offer is automatically applied to the transaction by a computing device associated with the interchange network, wherein the computing device is configured to process payment card transactions including the transaction initiated with the merchant over the interchange network using a set of proprietary communication standards for the exchange of transaction data and the settlement of funds between financial institutions that are members of the interchange network.

13. A gaming rewards computer system in accordance with claim 12 wherein the processor is further configured to:
store game configuration data within the memory, wherein the game configuration data include data associated with at least one of the game type of the merchant game application, a reward type of the merchant game application, a game occurrence rate of the merchant game application, and a reward redemption type of the merchant game application.

14. A gaming rewards computer system in accordance with claim 13 further configured to:
provide the merchant offer to the cardholder computing device based on the reward type of the merchant game application.

15. A gaming rewards computer system in accordance with claim 13 further configured to:
redeem the merchant offer by the cardholder based, at least in part, on the reward redemption type of the merchant game application.

16. A gaming rewards computer system in accordance with claim 12, wherein the merchant identifier is one of a barcode and an RFID tag.

17. A gaming rewards computer system in accordance with claim 12, further configured to:
receive the game result message wherein the game result message indicates that the cardholder has achieved a positive result for the merchant game, wherein the positive result is achieved by satisfying a pre-determined threshold associated with the merchant game application.

18. Non-transitory computer-readable storage media for providing an offer associated with a merchant to a cardholder engaging in a game having computer-executable instructions embodied thereon, wherein, when executed by at least one processor, the computer-executable instructions cause the processor to:
store merchant game data for the merchant within the memory, wherein the merchant game data includes game data associated with a merchant game application, a location of the merchant, and a predetermined distance associated with the merchant location;

receive a game request message from a cardholder computing device associated with the cardholder, wherein the game request message includes a cardholder locator identifying a location of the cardholder, the cardholder locator determined by the cardholder computing device based on at least one of GPS functionality, WiFi positioning, radio frequency location, proximity sensing, and a merchant identifier scanned by the cardholder computing device;

compare the cardholder locator in the game request message with the merchant location stored in the memory to determine whether the cardholder computing device is located within the predetermined distance of the merchant location;

retrieve from the memory, based on a determination that the cardholder computing device is within the predetermined distance of the merchant location, by the gaming rewards computer system, the game data;

upload the game data to the cardholder computing device to cause the merchant game application to be installed on the cardholder computing device;

receive from the cardholder computing device a game result message, the game result message generated in response to the cardholder playing the merchant game application and including a game result achieved by the cardholder;

determine, by the gaming rewards computer system, based on at least a characteristic of a payment card of the cardholder, a merchant offer associated with a product offered for purchase by the merchant, wherein different levels of merchant offers are determined depending on a bank associated with the payment card;

transmit, by the gaming rewards computer system, the merchant offer to the cardholder computing device in response to receiving the game result message to cause the merchant offer to be displayed on the cardholder computing device; and associate the merchant offer with a profile of the cardholder at an interchange network computing device associated with an interchange network, such that when the cardholder initiates a transaction with the merchant over the interchange network using the payment card, the merchant offer is automatically applied to the transaction by the interchange network computing device associated with the interchange network, wherein the interchange network computing device is configured to process payment card transactions including the transaction initiated with the merchant over the interchange network using a set of proprietary communication standards for the exchange of transaction data and the settlement of funds between financial institutions that are members of the interchange network.

* * * * *